United States Patent
Ducourant et al.

(10) Patent No.: US 7,087,880 B2
(45) Date of Patent: Aug. 8, 2006

(54) PHOTOSENSITIVE DEVICE AND METHOD FOR CONTROLLING SAME

(75) Inventors: Thierry Ducourant, Voiron (FR); Bruno Bosset, Coublevie (FR); Aysegul Van Oost, Sassengage (FR)

(73) Assignee: Trixell S.A.S., Moirans (FR)

( * ) Notice: Subject to any disclaimer, the term of this patent is extended or adjusted under 35 U.S.C. 154(b) by 447 days.

(21) Appl. No.: 10/416,894

(22) PCT Filed: Nov. 16, 2001

(86) PCT No.: PCT/FR01/03606
§ 371 (c)(1),
(2), (4) Date: May 16, 2003

(87) PCT Pub. No.: WO02/41621
PCT Pub. Date: May 23, 2002

(65) Prior Publication Data
US 2004/0099792 A1    May 27, 2004

(51) Int. Cl.
H01J 40/14    (2006.01)
H04N 5/217    (2006.01)

(52) U.S. Cl. .............. 250/214 R; 250/208.1; 250/208.2; 348/241; 348/308

(58) Field of Classification Search ............ 250/208.1, 250/208.2, 214 R; 327/514; 348/241, 294, 348/304, 308
See application file for complete search history.

(56) References Cited

U.S. PATENT DOCUMENTS

| 5,386,228 A | * | 1/1995 | Okino ................... 348/218.1 |
| 5,777,495 A | | 7/1998 | Arques et al. |
| 5,973,327 A | | 10/1999 | Moy et al. |
| 6,265,737 B1 | | 7/2001 | Ducourant |
| 6,410,898 B1 | | 6/2002 | Ducourant et al. |
| 6,528,775 B1 | | 3/2003 | Ducourant |
| 6,686,959 B1 | * | 2/2004 | Ducourant et al. ......... 348/241 |
| 6,798,453 B1 | * | 9/2004 | Kaifu ......................... 348/304 |
| 2002/0190216 A1 | | 12/2002 | Ducourant |
| 2002/0195567 A1 | | 12/2002 | Ducourant |

FOREIGN PATENT DOCUMENTS

| EP | 0 519 719 A | 12/1992 |
| EP | 0 918 434 A | 5/1999 |
| FR | 2 605 166 | 4/1988 |
| FR | 2 760 585 A | 9/1998 |
| FR | 2 770 954 A | 5/1999 |

* cited by examiner

*Primary Examiner*—Stephone B. Allen
(74) *Attorney, Agent, or Firm*—Lowe Hauptman & Berner, LLP

(57) ABSTRACT

The present invention relates to a photosensitive device comprising a matrix of photosensitive pixels, in particular of the type produced by techniques for depositing semiconductor materials. The invention relates more particularly (but not exclusively) to the driving of such devices used for detecting radiological images. It also relates to a method of driving the photosensitive device.

The photosensitive device includes means for adjusting the amplitude of the bias, allowing separate adjustment of the amplitude of the bias of the photosensitive pixels (P1 to P9; P401 to P409).

The method of driving the photosensitive device consists, in the calibration phase, in adjusting the amplitude of the bias of each of the photodetector elements (Dp) separately from one another, so as to bring the output saturation levels of the two photosensitive pixels into maximum coincidence.

10 Claims, 4 Drawing Sheets

PHOTOSENSITIVE DEVICE AND METHOD FOR CONTROLLING SAME

The present invention relates to a photosensitive device comprising a matrix of photosensitive pixels, of the type especially produced by deposition techniques for semiconductor materials. The invention relates more particularly (but not exclusively) to the driving of such devices used for the detection of radiological images. It also relates to a method of driving the photosensitive device.

Thin-film techniques for depositing semiconductor materials, such as hydrogenated amorphous silicon (a-SiH), on insulating substrates, for example made of glass, make it possible to produce matrices of photosensitive pixels that can produce an image from visible or near-visible radiation. To use these radiological image detection matrices, all that is required is to interpose, between the X-rays and the matrix, a scintillator screen for converting the X-rays into light rays within the wavelength band in which the photosensitive pixels are sensitive.

The photosensitive pixels which form these matrices generally comprise a photosensitive element associated with an element fulfilling a switch function.

The photosensitive element usually consists of a diode, connected in series with the switch element. The switch element may, for example, be a switching diode whose "closed" or "on" state corresponds to the bias that puts it into forward conduction and whose "open" or "off" state corresponds to its reverse bias. The two diodes are connected with opposed directions of conduction in what is called a "back-to-back" configuration. Such an arrangement is well known, for example from French patent application 86/14058 (publication number 2 605 166) which describes a matrix of photosensitive pixels of the type having two diodes in a "back-to-back" configuration, a method for reading the photosensitive pixels and a way of producing such a photosensitive device.

One drawback affects the quality of the images. The semiconductor components used in such photosensitive devices are not all identical and the photosensitive device exhibits inherent inhomogeneities which result in impaired regions and vary over time.

To try to obtain a useful image of optimum quality, a correction is firstly made to the useful image on the basis of an "offset image", also known as "dark image", generally taken and stored at the start of an operating cycle. This offset image is the image obtained when the photosensitive device is exposed to a signal of zero intensity and corresponds to a kind of background image. The offset image varies according to the electrical state of the components of the photosensitive pixels and to the dispersion of their electrical characteristics. The useful image is that read when the photosensitive device has been exposed to a useful signal, which corresponds to an exposure to X-rays. It encompasses the offset image. The correction consists in subtracting the offset image from the useful image.

In addition, to improve the useful image, a sensitivity correction is then made on the basis of a "gain" image. This image is obtained with a calibrated uniform illumination in the absence of the subject or object to be examined. The gain image is itself corrected by means of the offset image. The sensitivity correction consists in dividing the image of the subject or object to be examined by the gain image. It allows the spatial sensitivity variations to be properly corrected, since with a uniform illumination the image ought to be uniform.

As long as the photosensitive element has not saturated, during illumination, the two corrections described above are sufficient to ensure uniformity of the image obtained at the exit of the device. However, the output level of two adjacent photosensitive elements may differ when these are saturated.

This drawback is appreciable in radiology because of the high absorption of X-rays by the human body. For example, when a radiological image of the pelvis is taken in side view, certain dense regions may absorb around 999 per 1000 of the radiation emitted. For this type of radiology, the operator will tend to increase the amount of X-rays emitted, which will have the effect of saturating the photosensitive elements subjected to radiation passing through less dense regions such as, for example, a region comprising only skin. If the output level of two adjacent photosensitive elements differs when these are saturated, there is then a discontinuity in the image obtained at the exit of the device at these two pixels.

The object of the invention is to alleviate this problem by providing means for correctly joining up the image.

For this purpose, the subject of the invention is a photosensitive device having at least two photosensitive pixels, each comprising a switch element connected in series with a photodetector element, characterized in that it furthermore includes means for biasing each photodetector element and in that means for adjusting the amplitude of the bias allow separate adjustment of the amplitude of the bias of the photosensitive pixels.

The expression "bias of the photosensitive pixels" is understood to mean a bias produced independently of an image acquisition phase. More precisely, it is an initial bias which precedes an image acquisition phase.

The subject of the invention is also a method of driving a photosensitive device having at least two photosensitive pixels, each comprising a switch element connected in series with a photodetector element, characterized in that it consists, in the calibration phase, in adjusting the amplitude of the bias of each of the photodetector elements separately from one another so as to bring the output saturation levels of the two photosensitive pixels into maximum coincidence.

The invention is particularly beneficial when producing a large matrix of photosensitive pixels or a large linear array of photosensitive pixels. For example, detectors measuring 40 cm×40 cm are used in radiology. In fact, in this case, several substrates joined edge to edge are used. As regards the joining, it has been found that there are larger differences in output level between two adjacent photosensitive elements when these belong to two different substrates than when these belong to the same substrate. Advantageously, to simplify the photosensitive device, the same bias amplitude adjustment is maintained for all of the photosensitive pixels produced on the same substrate and, of course, this adjustment will be different for two adjacent substrates.

The invention will be more clearly understood and other advantages will become apparent on reading the detailed description of several embodiments of the invention given by way of example, these embodiments being illustrated by the appended drawing in which.

Figure 1:
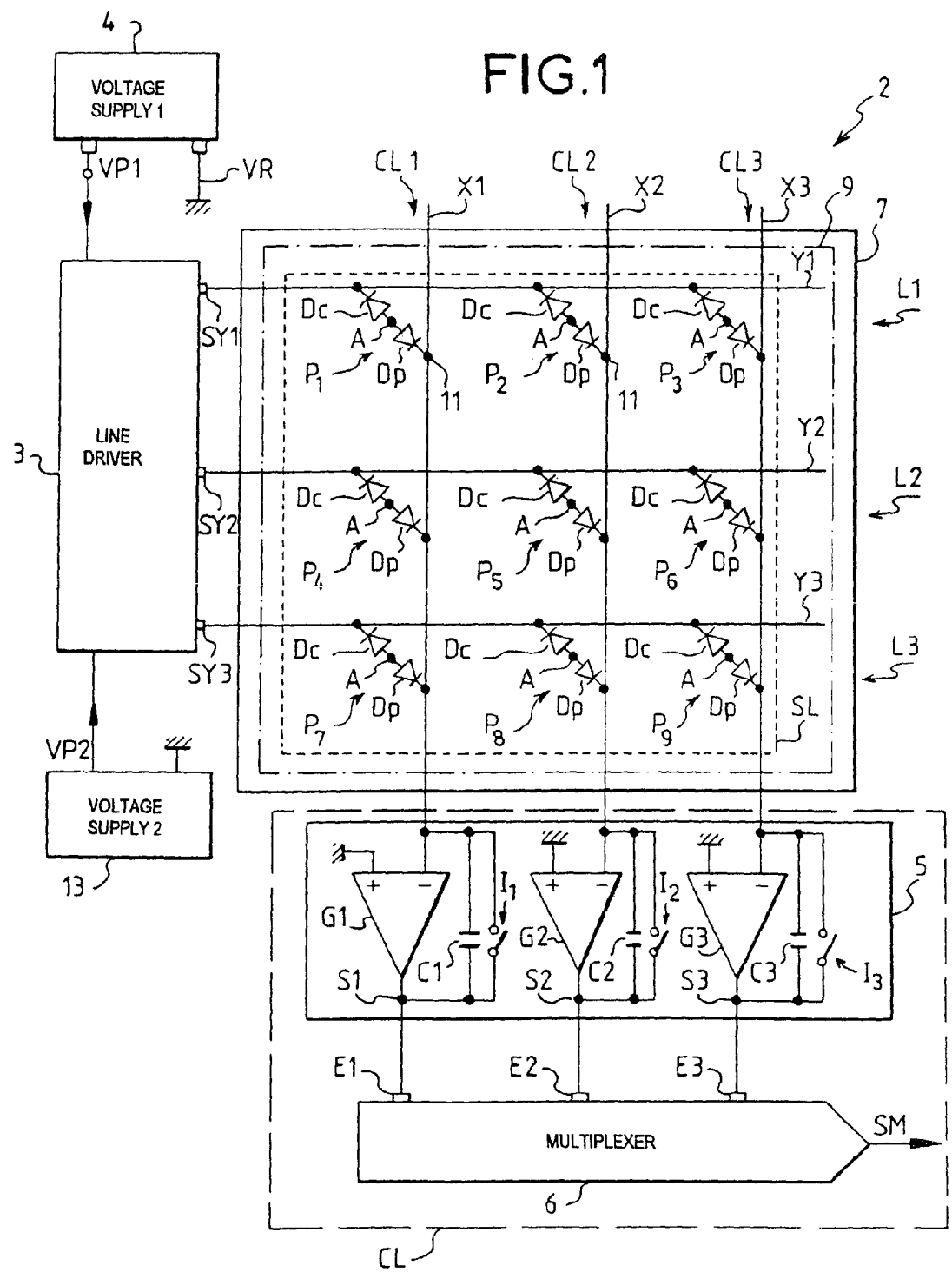
FIGS. 1 and 2 show photosensitive devices to which the invention may apply.

FIG. 1 shows a simplified diagram of a photosensitive device 1, comprising a matrix 2 organized in a conventional manner. The matrix 2 comprises photosensitive pixels P1 to P9, each formed by a photosensitive diode Dp and a switching diode Dc connected in series in a back-to-back configuration. The matrix includes line conductors Y1 to Y3 intersecting with column conductors X1 to X3, with, at each intersection, a photosensitive pixel connected between a line conductor and a column conductor. The photosensitive pixels P1 to P9 are thus arranged along lines L1 to L3 and columns CL1 to CL3.

In the example of FIG. 1, only three lines and three columns are shown, these defining nine photosensitive pixels, but such a matrix may have a much greater capacity, with possibly up to several million pixels. For example, it is common practice to produce such matrices having photosensitive pixels arranged in 3000 lines and 3000 columns (over an area of around 40 cm×40 cm) or else arranged along a single line and several columns, to constitute a linear detection array, or else arranged in a single line and a single column, to constitute a single photosensitive pixel.

The photosensitive device includes a line driver 3, the outputs SY1, SY2, SY3 are connected to the line conductors Y1, Y2, Y3, respectively. The line driver 3 is made up of various elements (not shown) such as, for example, a clock circuit, switching circuits and a shift register, which allow it to address the line conductors Y1 to Y3 sequentially. The photosensitive device furthermore includes a voltage supply 4 that delivers a voltage VP1 to the line driver 3 for defining the amplitude of the bias pulses applied to the line conductors and a voltage supply 13 that delivers a voltage VP2 to the line driver 3 for defining the amplitude of read pulses applied to the line conductors. These two voltage supplies may optionally be one and the same.

In each photosensitive pixel P1 to P9, the two diodes Dp, Dc are connected together either by their cathodes or, as in the example shown, by their anodes. The cathode of the photodiode Dp is connected to a column conductor X1 to X3 and the cathode of the switching diode Dc is connected to a line conductor Y1 to Y3.

In the image acquisition or image-taking phase, that is to say the phase in which the matrix 2 is illuminated by a "useful" light signal, the two diodes Dp, Dc of each photosensitive pixel P1 to P9 are reverse-bias, and in this state they each constitute a capacitor, It should be noted that in general the two diodes Dp, Dc are designed so that the capacitance presented by the photodiode Dp is the highest (of the order for example of 50 times). The photodetector element Dp discharges under the effect of illumination.

When exposed to a useful light signal, charges are generated in the photodiode Dp by the illumination of the photosensitive pixel P1 to P9 to which it belongs. These charges, the number of which depends on the intensity of illumination, build up at a point "A" on the floating node formed at the junction between the two diodes Dp, Dc. The photosensitive pixels. P1 to P9 are read line by line, simultaneously for all the photosensitive pixels connected to the same line conductor Y1 to Y3. For this purpose, the line driver 3 applies a read pulse of given amplitude to each line conductor Y1 to Y3 addressed; the line conductors that are not addressed are kept at a reference potential Vr or rest potential, which is ground for example, and may be the same potential as that applied to the column conductors X1 to X3.

Any accumulation of charges at the point "A" of a photosensitive pixel P1 to P9 causes a reduction in the voltage at this point, that is to say a reduction in the reverse bias voltage for the photodiode Dp. In certain operating modes, the application of the read pulse to a line conductor Y1 to Y3 has the effect of restoring, to the potential of the point "A" of all the photosensitive pixels connected to this line conductor, the bias level that it had before exposure to the useful light signal: this results in a flow in each of the column conductors X1 to X3 of a current proportional to the charges accumulated at the point "A".

The column conductors X1 to X3 are connected to a read circuit CL comprising, in the example, an integrator circuit 5 and a multiplexer circuit 6 which is formed, for example, by a shift register with parallel inputs and serial output, possibly of the CCD (Charge Coupled Device) type. Each column conductor is connected to a negative input "−" of an amplifier G1 to G3 connected as an integrator. An integration capacitor C1 to C3 is connected between the negative input "−" and an output S1 to S3 of each amplifier. The second input "+" of each amplifier G1 to G3 is connected to a potential which, in the example, is the reference potential Vr, which potential is consequently imposed on all the column conductors X1 to X3. Each amplifier includes a resetting switch element I1 to I3 (formed, for example, by an MOS-type transistor) connected in parallel to each integration capacitor C1 to C3.

The outputs S1 to S3 of the amplifiers are connected to the inputs E1 to E3 of the multiplexer 6. This conventional arrangement makes it possible to deliver "serially" and line by line (L1 to L3), as output SM from the multiplexer 6, signals corresponding to the charges accumulated at the points "A" of all the photosensitive pixels P1 to P9.

It should be noted that it is also known, in order to fulfill the switch function which, in the example of FIG. 1, is provided by the switching diode Dc, to use a transistor; the latter has, compared with the diode, a greater connection complexity, but it does have advantages in the quality of its "on" state, which advantages will be explained in the rest of the description.

Figure 2:
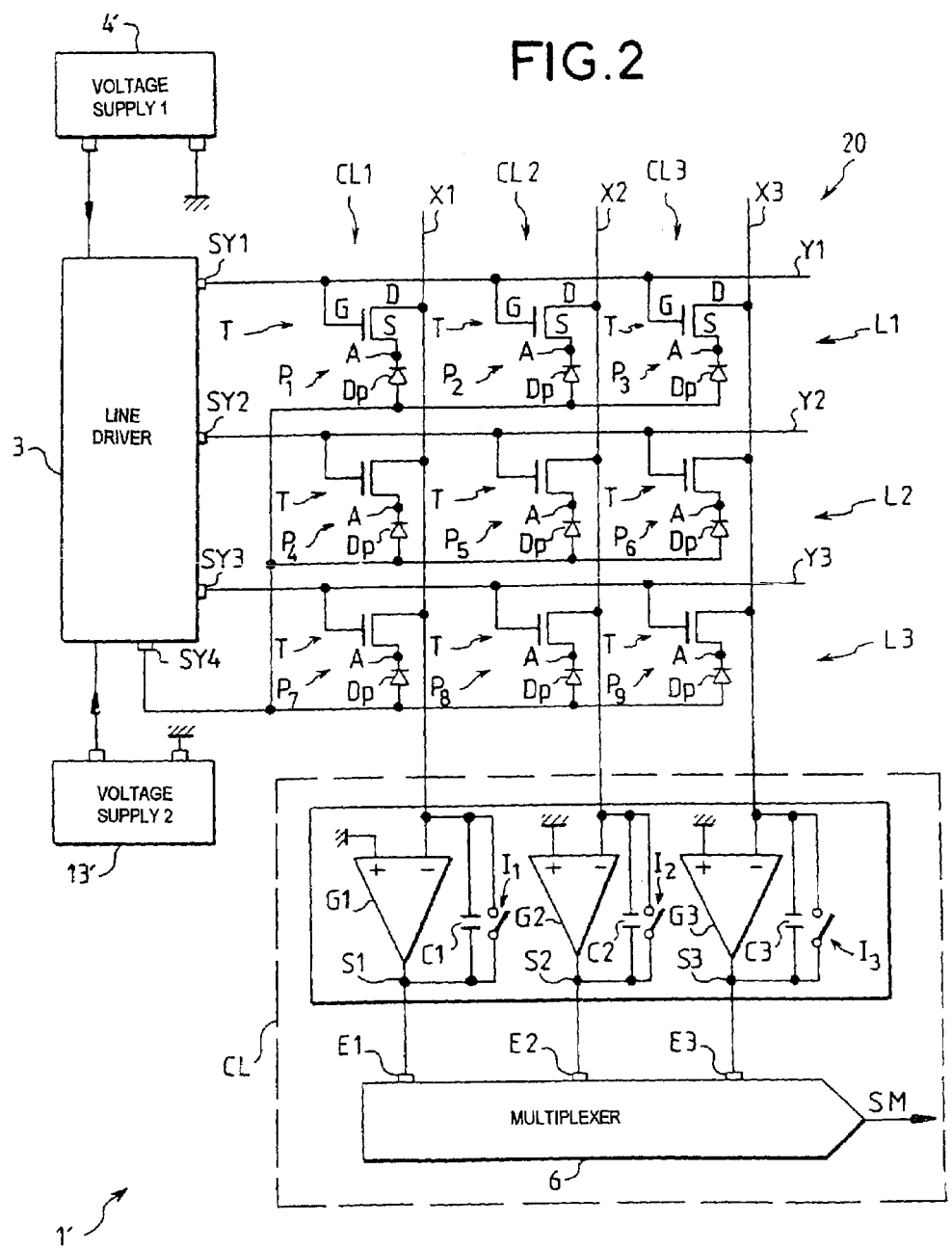

FIG. 2 illustrates schematically a photosensitive device 1' that differs from that of FIG. 1 mainly in that it comprises a matrix 20 in which the switching diodes Dc are replaced with transistors T, for example produced by thin-film deposition techniques. These techniques are known by the name Thin Film Transistor (TFT) techniques. These techniques may also be used to produce the matrix 2 shown in FIG. 1.

In the diagram shown in FIG. 2 as an example, the transistor T in each photosensitive pixel P1 to P9 is connected by its source S to the cathode of the photodiode Dp, that is to say at the point "A", its gate G is connected to the line conductor Y1 to Y3 to which the photosensitive pixel belongs and its drain D is connected to the column conductor X1 to X3 to which the photosensitive pixel belongs. The anodes of all the photodiodes Dp are joined together and connected to an output SY4 of the line driver 3. The output SY4 delivers a bias voltage VP1, negative relative to the reference potential VR or ground, around −5 volts for example, which serves to reverse-bias the photodiodes Dp; the line driver 3 receives, for example, this bias voltage from a supply 4'.

For a greater understanding of the operation of the devices shown in FIGS. 1 and 2, reference may be made to the French patent application published under No. FR 2 760 585.

Figure 3:
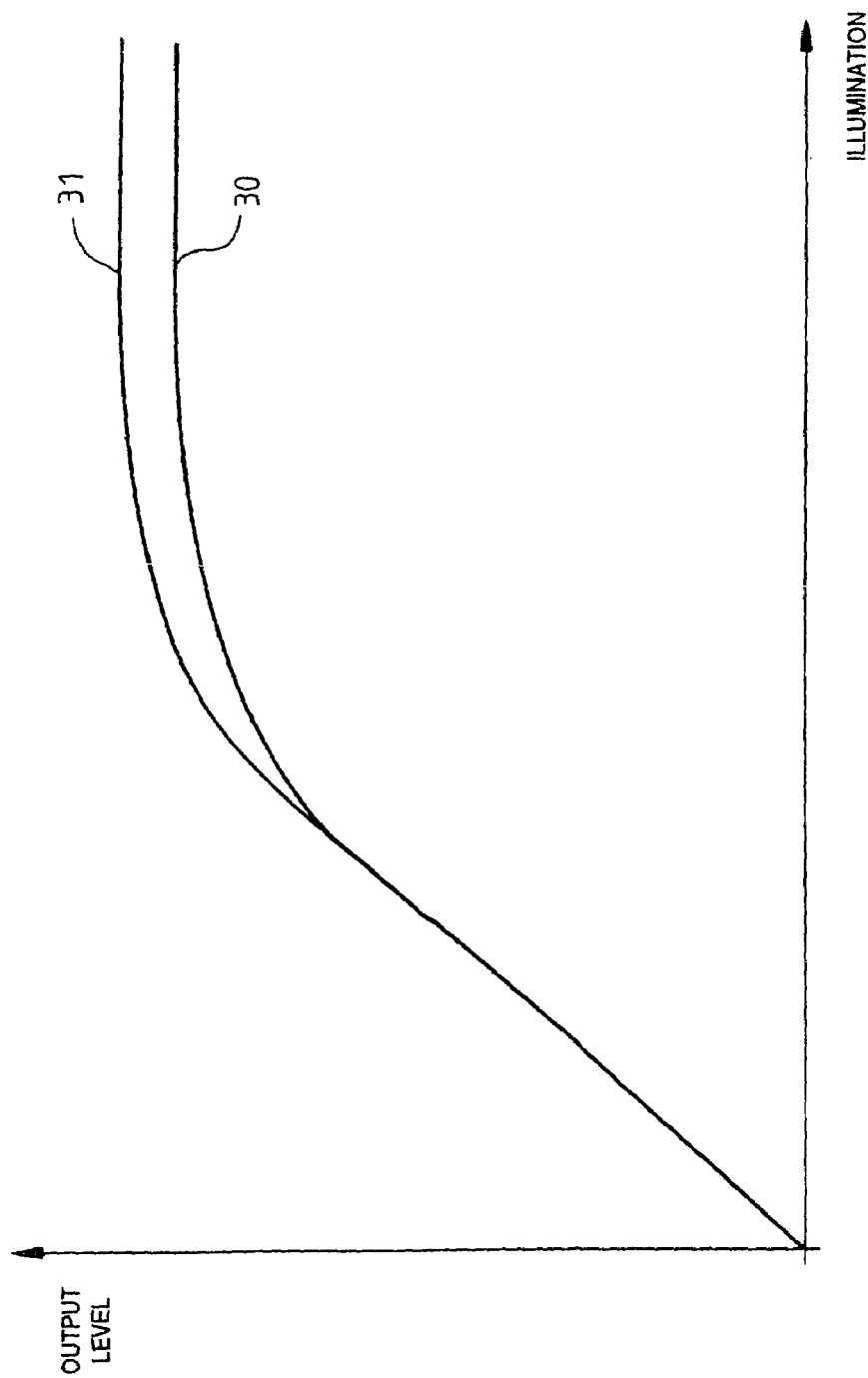
FIG. 3 shows in the form of a curve the variation in the output level of two photosensitive pixels as a function of their illumination.

In FIG. 3, two curves 30 and 31 show the variation in the level of the output signal from two photosensitive pixels as a function of the illumination that is applied to them. These photosensitive pixels have for example a photodiode Dp. The two curves 30 and 31 coincide for low illumination levels. This coincidence is obtained by the means for making offset and gain corrections carried out, for example, in a computing unit that receives the signal from the output SM of the multiplexer 6. The computing unit is not shown in FIGS. 1 and 2. The two curves are then in the form of a straight line portion.

When the illumination increases beyond the linear range described above, the photodiode Dp becomes weakly biased. The charge collection efficiency drops, until it becomes zero. At these illumination levels, the slopes of curves 30 and 31 decrease, becoming zero when the illumination increases. Curves 30 and 31 therefore each reach a horizontal asymptote corresponding to an output level that no longer changes. It has been found that, after offset and gain correction, the maximum output levels achievable by two photodiodes may be different.

The invention alleviates this problem by providing a device and a method for making the two curves 30 and 31 substantially coincident in their nonlinear ranges, by bringing their output level asymptotes together. This maximum level is also called the saturation level. To achieve this result, the invention is able to provide a different adjustment of the amplitude VP1 of the bias of two different photosensitive pixels, for which it is desired to make curves 30 and 31 coincide.

The invention is particularly useful when the photosensitive device is produced from several substrates joined edge to edge. One embodiment of such an assembly is shown schematically in FIG. 4. Four matrices 40, 41, 42 and 43 each have photosensitive pixels P401 to P409 in the case of the matrix 40, P411 to P419 in the case of the matrix 41, P421 to P429 in the case of the matrix 42 and P431 to P439 in the case of the matrix 43. Each photosensitive pixel may have two diodes Dc and Dp, as shown in FIG. 1, or one diode Dc and one transistor T, as shown in FIG. 2. These constructions of photosensitive pixels and the number of them are given merely as an example. The same applies to the number of matrices forming the device. The matrices 40 to 43 have line conductors Y01 to Y03 in the case of the matrix 40, Y11 to Y13 in the case of the matrix 41, Y21 to Y23 in the case of the matrix 42 and Y31 to Y33 in the case of the matrix 43. These line conductors intersect with column conductors X021 to X023 in the case of the matrices 40 and 42, and X131 to X133 in the case of the matrices 41 and 43.

At each intersection, a photosensitive pixel is connected between a line conductor Yn and a column conductor Xn. Associated with each matrix 40 to 43, a line driver, 50 to 53 respectively, is connected to the line conductors of each matrix and fulfils the same functions as the line driver 3 shown in FIGS. 1 and 2.

In accordance with the invention, the line drivers 50 to 53 are different so as to allow separate adjustment of the bias amplitude for each matrix. For this purpose, voltage supplies 60 to 63 are each connected to one of the line drivers 50 to 53, respectively. Moreover, the voltage supply 13 may be connected to four line drivers 50 to 53, so as to define the amplitude of read pulses, this amplitude being, for example, the same for the four matrices 50 to 53.

The column conductors X021 to X133 are, as in the devices shown in FIGS. 1 and 2, connected to the read circuit CL.

It is possible to implement the invention with a device having no voltage supply 13. The amplitude of the read pulses is then equal to the amplitude of the bias pulses and is defined for each matrix by the voltage supplies 60 to 63. Advantages in differentiating the read pulse amplitude from the bias amplitude are given in the French patent application published under No. FR 2 760 585. The description of that application specifies in particular that an amplitude difference between the amplitudes VP1 and VP2 makes it possible to create drive charges which flow during a read phase in the column conductors in addition to the charges generated at the photosensitive pixel read, by a useful illumination (useful charges). These drive charges are generated with low noise and therefore have very little effect on the reading of the useful charges.

When the invention is implemented in a device in which each photosensitive pixel has two diodes Dc and Dp as shown in FIG. 1, it is advantageous to adjust the amplitude of the read pulse according to the bias amplitude. More precisely, by keeping the same difference between the values of these two amplitudes, the same read efficiency for all the photosensitive pixels is maintained.

Figure 4:
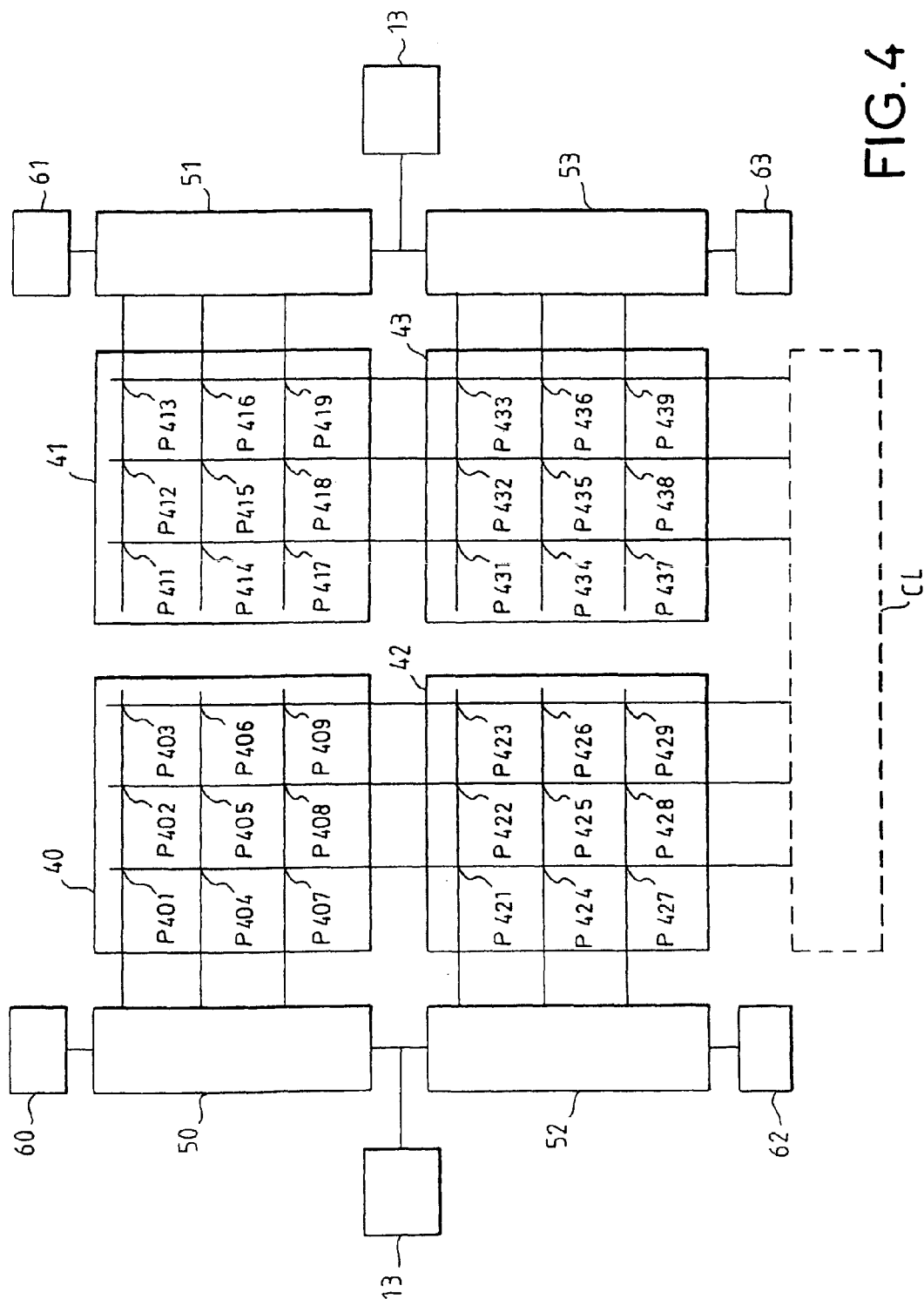
FIG. 4 shows four matrices of photosensitive pixels joined edge to edge.

On the other hand, when the invention is implemented in a device in which each photosensitive pixel has a diode Dp and a transistor T, the amplitude of the bias VP1 is delivered to all the photosensitive pixels via the output SY4 of each driver 50 to 53 (this output not being shown in FIG. 4). On the other hand, the read pulses are delivered by line conductors connecting the drivers 50 to 53 to the various photosensitive pixels. This makes the read pulses independent of the bias amplitude. It is possible to maintain the same voltage for all of the read pulses without any effect on the read efficiency, even when the amplitude of the bias is varied between two photosensitive pixels of the device.

The bias amplitude is adjusted matrix by matrix so as to bring the saturation output levels of the adjacent photosensitive pixels belonging to two adjacent matrices into maximum coincidence. This adjustment may be carried out empirically by dichotomy. More precisely, a mean output level is measured for each matrix when the photosensitive pixels are saturated, for minimum and maximum possible amplitudes of the bias pulses. A third measurement is made for an amplitude value centered approximately between the first two amplitude values. From these three measurements, the two measurements for which the adjustment is the best is determined. This makes it possible to reduce by a factor of approximately two the time required to search for the optimum value of the bias amplitude. The operations allowing the search time to be reduced by a factor of two may be repeated as many times as necessary in order to achieve the best joining.

The invention claimed is:

1. A photosensitive device, comprising:
   photosensitive pixels each comprising a switch element connected in series with a photodetector element;
   biasing means for biasing each photodetector element;
   and adjusting means for adjusting the amplitude of the bias allow the amplitude of the bias of the photosensitive pixels to be adjusted separately from one another.

2. The device as claimed in claim 1, further including pulsing means for generating a read pulse, the amplitude of which is common to all the photosensitive pixels.

3. The device as claimed in claim 1, further comprising several adjacent matrices, each comprising a plurality of photosensitive pixels, and in that the adjustment of the amplitude of the bias pulses is common to all the pixels on one matrix and is different from one matrix to another.

4. The device as claimed in claim 3, further including pulsing means for generating a read pulse, the amplitude of which is common to all the photosensitive pixels.

5. The device as claimed in claim 1, wherein said photodetector element has a capacitor that discharges under the effect of illumination.

6. The device as claimed in claim 5, further comprising several adjacent matrices, each comprising a plurality of photosensitive pixels, and in that the adjustment of the amplitude of the bias pulses is common to all the pixels on one matrix and is different from one matrix to another.

7. The device as claimed in claim 5, further including pulsing means for generating a read pulse, the amplitude of which is common to all the photosensitive pixels.

8. A method of driving a photosensitive device having at least two photosensitive pixels each comprising a switch element connected in series with a photodetector element, comprising the steps of adjusting in the calibration phase the amplitude of the bias of each of the photodetector elements (Dp) separately from one another so as to bring the output saturation levels of the two photosensitive pixels into maximum coincidence.

9. The method as claimed in claim 8, wherein the device comprises several adjacent matrices, each having a plurality of photosensitive pixels, and in that the adjustment of the amplitude of the bias which is common to all the pixels on one matrix and is different from one matrix to another.

10. The method as claimed in claim 9, wherein the adjustment is made by dichotomy.

* * * * *